(12) United States Patent
Otani

(10) Patent No.: US 9,725,075 B2
(45) Date of Patent: Aug. 8, 2017

(54) VALVE APPARATUS AND WASHER APPARATUS

(71) Applicant: Mitsuba Corporation, Gunma (JP)

(72) Inventor: Atsushi Otani, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 14/903,096

(22) PCT Filed: Jun. 25, 2014

(86) PCT No.: PCT/JP2014/066858
§ 371 (c)(1),
(2) Date: Jan. 6, 2016

(87) PCT Pub. No.: WO2015/005115
PCT Pub. Date: Jan. 15, 2015

(65) Prior Publication Data
US 2016/0214577 A1     Jul. 28, 2016

(30) Foreign Application Priority Data
Jul. 8, 2013    (JP) ................................. 2013-142575

(51) Int. Cl.
*B60S 1/48*      (2006.01)
*B60S 1/52*      (2006.01)
(Continued)

(52) U.S. Cl.
CPC ................. *B60S 1/52* (2013.01); *B60S 1/481* (2013.01); *F04D 13/0693* (2013.01); *F04D 15/0016* (2013.01); *F16K 7/00* (2013.01)

(58) Field of Classification Search
CPC .... B60S 1/48; B60S 1/481; B60S 1/52; F04D 15/0016; F04D 29/4293; F04D 29/486; F16K 7/00
(Continued)

(56) References Cited

U.S. PATENT DOCUMENTS 4,600,361 A * 7/1986 Bianco ................... B60S 1/481
                                                              415/146
4,728,260 A * 3/1988 Ishii ....................... B60S 1/481
                                                              137/118.06

(Continued)

FOREIGN PATENT DOCUMENTS

DE        86 10 016 U1     4/1986
DE       295 19 465 U1    12/1995
(Continued)

OTHER PUBLICATIONS

International Search Report for PCT Serial No. PCT/JP2014/066858 dated Sep. 1, 2014.
(Continued)

*Primary Examiner* — Darren W Gorman
(74) *Attorney, Agent, or Firm* — McCormick, Paulding & Huber LLP

(57) ABSTRACT

An object of the present invention is to provide a valve apparatus capable of keeping a holding state of a valve body. The valve apparatus 14 is adapted to supply cleaning fluid by switching between a first flow channel 54 and a second flow channel 55, the valve apparatus 14 being provided with: a first fluid pipe 44 having a first flow channel 54; a second fluid pipe 45 coaxially aligned with the first fluid pipe 44, the second fluid pipe 45 having a second flow channel 55; a housing 86 provided with a first valve chamber 37 and a second valve chamber 38; a partition wall 49 disposed between the first flow channel 44 and the second flow channel 55 in the housing 86; and a rib 46 provided to the
(Continued)

housing 86 to support the partition wall 49, wherein the partition wall 49 has: a film-like valve body 50 which is elastically deformed by pressure of the first valve chamber 37 and the second valve chamber 38 so as to open one of the first flow channel 44 and the second flow channel 55 and close the other of the first flow channel 54 and the second flow channel 55; and a frame 51 attached along an outer circumference of the valve body 50 and supported by the rib 56, wherein the frame 51 is higher in stiffness than the valve body 50.

4 Claims, 7 Drawing Sheets

(51) Int. Cl.
*F04D 15/00* (2006.01)
*F04D 13/06* (2006.01)
*F16K 7/00* (2006.01)

(58) Field of Classification Search
USPC ........ 239/284.1, 284.2; 415/146, 152.1, 911;
417/280, 302, 315, 423.1, 442; 137/99,
137/119.01, 119.03
See application file for complete search history.

(56) References Cited

U.S. PATENT DOCUMENTS

| | | | | |
|---|---|---|---|---|
| 4,824,332 A | * | 4/1989 | Perkins | F04D 15/0016 415/146 |
| 4,838,488 A | * | 6/1989 | Heier | B60S 1/481 137/594 |
| 4,874,298 A | * | 10/1989 | Mainardi | B60S 1/481 415/148 |
| 4,900,235 A | * | 2/1990 | Perkins | F04D 15/0016 415/146 |
| 4,919,591 A | * | 4/1990 | Kamimura | B60S 1/481 415/152.1 |
| 5,344,293 A | * | 9/1994 | Mota | B60S 1/481 137/119.03 |
| 5,486,089 A | * | 1/1996 | Chung | F04D 15/0016 415/146 |
| 5,934,872 A | * | 8/1999 | Yamauchi | B60S 1/481 415/146 |
| 5,984,644 A | * | 11/1999 | Yu | F04D 15/0016 417/280 |
| 6,050,286 A | * | 4/2000 | Kruer | F16K 11/0853 137/119.03 |
| 6,296,198 B1 | * | 10/2001 | Tores | B60S 1/481 239/284.1 |
| 6,491,503 B2 | * | 12/2002 | Hoffmann | F04D 29/426 239/284.1 |
| 2003/0075207 A1 | * | 4/2003 | Fukushima | B60S 1/481 134/123 |
| 2005/0150982 A1 | * | 7/2005 | Lopez | F04D 15/0016 239/601 |
| 2009/0114254 A1 | * | 5/2009 | Jeppe | B60S 1/481 134/34 |
| 2014/0166109 A1 | * | 6/2014 | Takai | B60S 1/481 137/1 |

FOREIGN PATENT DOCUMENTS

| | | |
|---|---|---|
| DE | 102007052490 A1 | 5/2009 |
| EP | 0 234 802 A2 | 9/1987 |
| JP | H04203569 A | 7/1992 |
| JP | H05504922 A | 7/1993 |
| JP | 2003-222262 A | 8/2003 |
| JP | 2009-287527 A | 12/2009 |
| WO | 03/095277 A1 | 11/2003 |

OTHER PUBLICATIONS

Extended European Search Report for European Patent Application No. 14823181.4-1607 ated Feb. 2, 2017.

* cited by examiner

VALVE APPARATUS AND WASHER APPARATUS

CROSS REFERENCE TO RELATED APPLICATION

Applicant hereby claims foreign priority benefits under U.S.C. §119 from International Patent Application Serial No. PCT/JP2014/066858 filed on Jun. 25, 2014 and Japanese Patent Application Serial No. 2013-142575 filed on Jul. 8, 2013, the contents of which are incorporated by reference herein.

TECHNICAL FIELD

The present invention relates to a valve apparatus capable of supplying fluid by switching between two directions, and a washer apparatus having the valve apparatus.

BACKGROUND ART

Conventionally, a vehicle is provided with a washer apparatus for discharging cleaning fluid toward a front window and a rear window when wiping the front window and the rear window with wipers. One example of the washer apparatus is described in Japanese Patent Application Laid-Open Publication No. 2003-222262 and Japanese Patent Application Laid-Open Publication No. 2009-287527.

The washer apparatus described in Japanese Patent Application Laid-Open Publication No. 2003-222262 and Japanese Patent Application Laid-Open Publication No. 2009-287527 has a washer pump and a valve apparatus. The washer pump has: a pump main body provided with a suction port and a pump chamber; an impeller rotatably provided to the pump chamber; an electric motor for rotating the impeller in forward and backward directions; a first conduit and a second conduit connected to the pump chamber; a first flow channel which guides cleaning fluid to a front window; and a second flow channel which guides cleaning fluid to a rear window.

On the other hand, the valve apparatus has a valve body accommodation chamber to which the first conduit and the second conduit are connected and the first flow channel and the second flow channel are connected; and a valve body provided to the valve body accommodation chamber. The valve body is integrally formed of rubber-like elastic material, and supported by a housing forming the valve body accommodation chamber. The housing is provided with a support portion. With the outer circumference of the valve body fitted into the support portion, the valve body is supported by the housing.

In the washer apparatus described in Japanese Patent Application Laid-Open Publication No. 2003-222262 and Japanese Patent Application Laid-Open Publication No. 2009-287527, when the impeller is rotated by motive power of the electric motor, cleaning fluid in a washer tank is suctioned into the pump chamber via the suction port. As a result, a pressure difference is generated between the two sides of the valve body in accordance with the rotation direction of the impeller, and the valve body is elastically deformed by the pressure of cleaning fluid, thereby opening one of the first flow channel and the second flow channel and closing the other of the first flow channel and the second flow channel. Then, by changing the rotation direction of the electric motor, cleaning fluid can be selectively discharged to either the front window or the rear window.

SUMMARY

In recent years, for the expansion of an area of a window to be wiped by a wiper in a vehicle, it is required to discharge cleaning fluid over a wide range. Therefore, the washer apparatus is adapted to discharge clearing fluid with high pressure. However, in the washer apparatus described in Japanese Patent Application Laid-Open Publication No. 2003-222262 and Japanese Patent Application Laid-Open Publication No. 2009-287527, when cleaning fluid acts on the valve body at high pressure, there is a possibility that the valve body is detached from the support portion or tilted.

An object of the present invention is to provide a valve apparatus and a washer apparatus capable of preventing the valve body from being detached from the support portion or tilted.

A valve apparatus according to the present invention supplies pumped fluid by switching between a first flow channel and a second flow channel, the valve apparatus being provided with: a housing provided with a first valve chamber connected to the first flow channel and a second valve chamber connected to the second flow channel; a partition wall disposed between the first flow channel and the second flow channel in the housing to separate the first valve chamber from the second valve chamber; and a support portion provided to the housing to support the partition wall. The partition wall has: a film-like valve body which is elastically deformed by pressure of the first valve chamber and the second valve chamber so as to open one of the first flow channel and the second flow channel and close the other of the first flow channel and the second flow channel; and a frame attached along an outer circumference of the valve body and supported by the support portion. The frame is higher in stiffness than the valve body.

In the valve apparatus according to the present invention, the first flow channel and the second flow channel are coaxially aligned with each other, and the valve apparatus is provided with: an engaging portion formed along the outer circumference of the valve body and projecting inward in a radial direction of the first flow channel and the second flow channel; and a support groove disposed in the engaging portion in the radial direction, an outer circumference of the frame being fitted into the support groove.

The valve apparatus according to the present invention includes: a first fluid pipe including the first flow channel and a second fluid pipe including the second flow channel and disposed concentrically with the first fluid pipe, and a distance from the valve body to an end portion of the first fluid pipe and a distance from the valve body to an end portion of the second fluid pipe are equal to each other in a direction in which the first fluid pipe and the second fluid pipe are disposed.

In the valve apparatus according to the present invention, both ends of the partition wall in the direction in which the first fluid pipe and the second fluid pipe are disposed are each provided with a contact surface in contact with the support portion and perpendicular to the direction of disposition.

A washer apparatus according to the present invention has: a washer tank in which fluid is stored; a pump apparatus which is rotated by motive power of an electric motor to suction and pump fluid in the washer tank; a first flow channel which supplies fluid pumped by the pump apparatus to a front window nozzle of a vehicle; a second flow channel which supplies fluid pumped by the pump apparatus to a rear window nozzle of the vehicle; and a valve apparatus which supplies fluid pumped by a pump apparatus by switching between the first flow channel and the second flow channel. The valve apparatus comprises: a housing provided with a first valve chamber connected to the first flow channel and a second valve chamber connected to the second flow channel; a partition wall disposed between the first flow channel and the second flow channel in the housing to partition the first valve chamber and the second valve chamber, and a support portion provided to the housing to support the partition wall. The partition wall has: a film-like valve body which is elastically deformed by pressure of the first valve chamber and the second valve chamber so as to open one of the first flow channel and the second flow channel and close the other of the first flow channel and the second flow channel; and a frame attached along an outer circumference of the valve body and supported by the support portion. The frame is higher in stiffness than the valve body.

In the valve apparatus of the present invention, the valve body is prevented from being detached from the support portion or from being tilted when the pressure of cleaning fluid is applied to the valve body.

In the valve apparatus of the present invention, even if an outer circumferential portion of the valve body is pulled in a radially-inward direction with the first flow channel and the second flow channel as a center, the engaging portion is engaged with the frame. Therefore, it is possible to prevent the valve body from being detached from the support portion.

According to the valve apparatus of the present invention, the pressure in the second valve chamber when the first flow channel is closed and the pressure in the first valve chamber when the second flow channel is closed are equal to each other.

According to the valve apparatus of the present invention, the partition wall can be supported by the support portion irrespective of the direction of the partition wall.

According to the washer apparatus of the present invention, it is possible to prevent the valve body from being detached from the support portion or tilted when the pressure of cleaning fluid is applied to the valve body.

DETAILED DESCRIPTION

Figure 1:
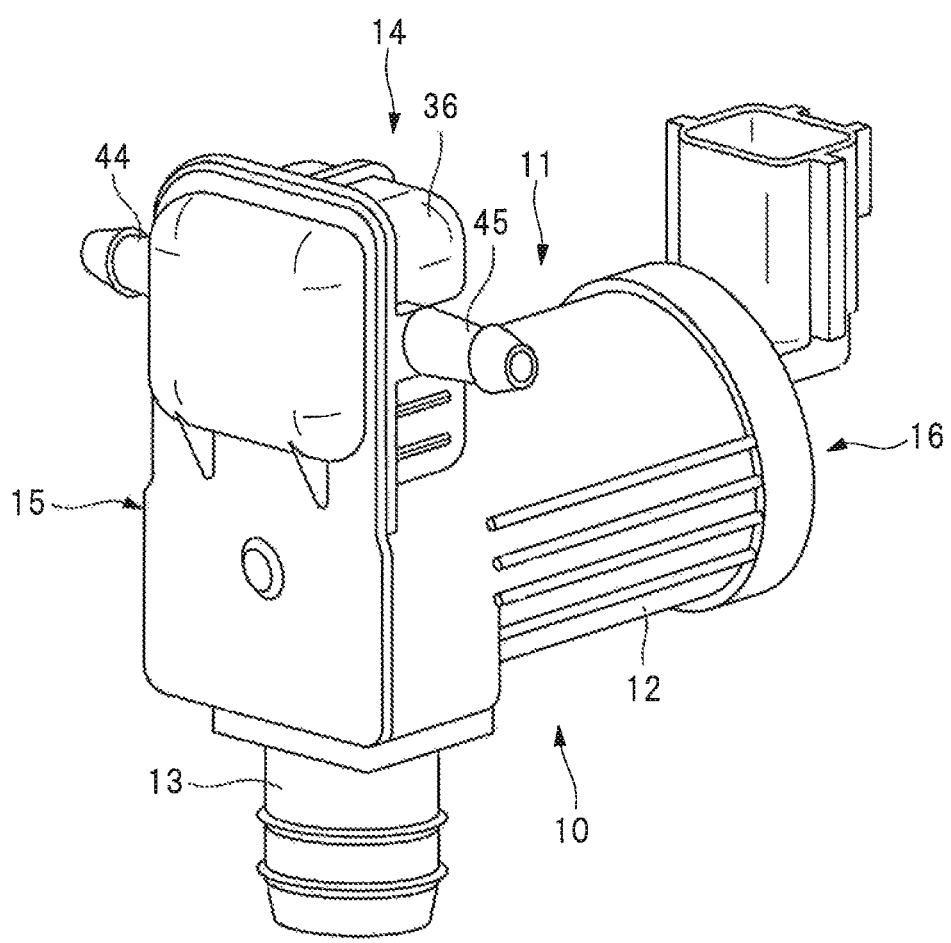
FIG. 1 is a perspective view of a washer pump which is applied to a washer apparatus of the present invention.
Figure 2:
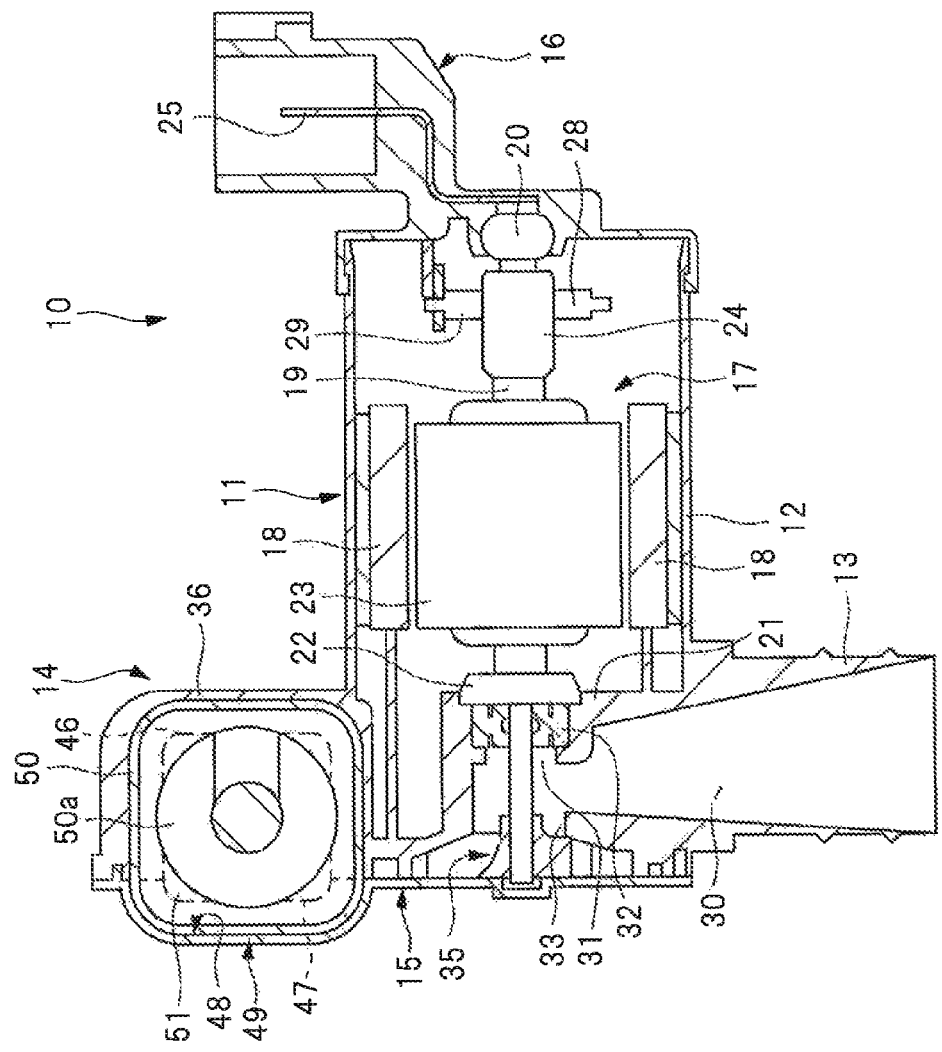
FIG. 2 is a sectional front view of the washer pump of FIG. 1.
Figure 3:
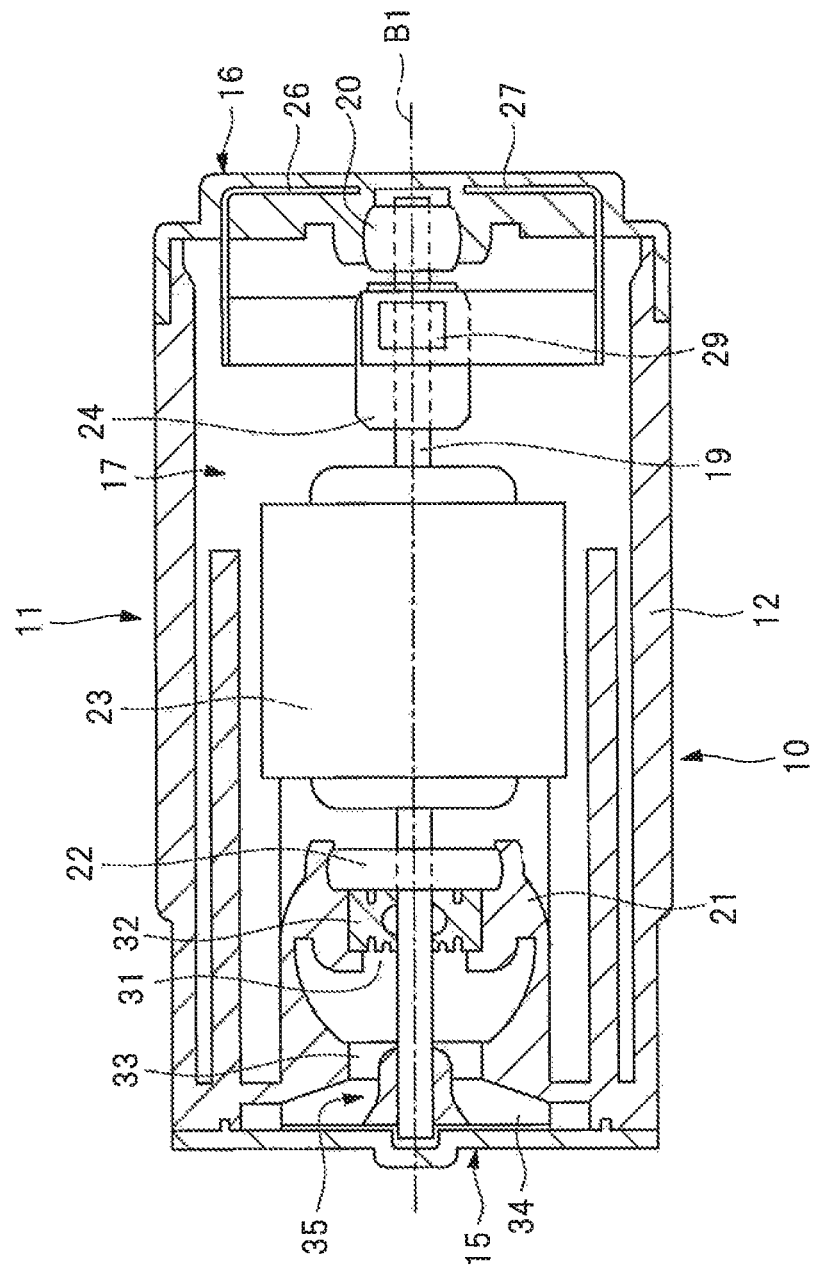
FIG. 3 is a sectional plan view of the washer pump of FIG. 1.

Hereinafter, an embodiment of the present invention will be described in detail with reference to drawings. FIGS. 1 to 4B show a pump apparatus 10 which discharges cleaning fluid to a front window 59a and a rear window 59b of a vehicle 59. A washer apparatus 63 of the present invention has a washer tank 62, the pump apparatus 10, a front window nozzle 60, and a rear window nozzle 61.

The pump apparatus 10 has a casing 11, and the casing 11 has a cylindrical portion 12 and a suction pipe 13 continuously formed with the cylindrical portion 12. In addition, the pump apparatus 10 is provided with a valve apparatus 14 which is on the opposite side of the cylindrical portion 12 from the suction pipe 13. Furthermore, the pump apparatus 10 is provided with a cover 15 and a terminal holder 16, and they are arranged so as to close openings of the casing 11. The casing 11 is integrally formed of resin, and an electric motor 17 is provided inside the casing 11. The electric motor 17 has a permanent magnet 18 fixed to an inner surface of the casing 11 and an armature shaft 19 rotatably provided inside the casing 11. The terminal holder 16 is provided with a bearing 20, and a bearing 22 is attached to a wall 21 provided inside the casing 11. The armature shaft 19 is supported by the two bearings 20 and 22. An armature 23 and a commutator 24 are provided to an outer circumference of the armature shaft 19.

The terminal holder 16 is integrally formed of resin, and two terminals 25 are buried in the terminal holder 16. Terminals 26 and 27 are respectively connected to the terminals 25, a brush 28 is supported by the terminal 26, and a brush 29 is supported by the terminal 27. The brushes 28 and 29 are in contact with the commutator 24. Therefore, when electric power is supplied to the commutator 24 via the two terminals 25, a rotating magnetic field is formed between the permanent magnet 18 and the armature 23, thereby rotating the armature shaft 19. In addition, in this electric motor 17, by switching the direction of energization to the terminals 25, the rotation direction of the armature shaft 19 can be switched to a forward or backward direction.

A suction passage 30 is provided inside the suction pipe 13, and the suction passage 30 is connected to a washer tank 62. Cleaning fluid is stored in the washer tank 62. The suction passage 30 extends from the suction pipe 13 through the wall 21. In addition, the wall 21 is provided with a shaft hole 31, and the bearing 22 is disposed in the shaft hole 31. Furthermore, an annular gasket 32 is attached to an inner circumferential surface of the shaft hole 31. The gasket 32 is a sealing apparatus which seals and separates the inner space of the cylindrical portion 12 from the suction passage 30 in a fluid-tight manner.

Furthermore, a passage 33 is provided on the opposite side from the shaft hole 31 of the wall 21, and an accommodation chamber 34 is provided between the cover 15 and the wall 21. The accommodation chamber 34 is connected to the suction passage 30 via the passage 33, and an impeller 35 is provided in the accommodation chamber 34. A tip of the armature shaft 19 is disposed in the accommodation chamber 34, and the impeller 35 is fixed to the tip of the armature shaft 19. Therefore, the impeller 35 is rotated by motive power of the electric motor 17.

The valve apparatus 14 has a housing 36 continuously extending from the cylindrical portion 12 as shown in FIGS. 4A to 6. A first valve chamber 37 and a second valve chamber 38 are formed inside the housing 36. A first passage 39 connecting the accommodation chamber 34 with the first valve chamber 37 and a second passage 40 connecting the accommodation chamber 34 with the second valve chamber 38 are provided between the wall 21 and the cover 15. The first passage 39 and the second passage 40 are partitioned by a partition wall 41. The partition wall 41 is provided so as to continuously extend from the wall 21. Furthermore, the valve apparatus 14 is provided with an outer circumferential wall 42 surrounding the accommodation chamber 34, the first valve chamber 37, and the second valve chamber 38. An inner surface 43 of the outer circumferential wall 42 has an arc shape in the vicinity of the accommodation chamber 34.

A first fluid pipe 44 is provided so as to extend from the inside of the first valve chamber 37 to the outside of the housing 36, and a second fluid pipe 45 is provided so as to extend from the inside of the second valve chamber 38 to the outside of the housing 36. A first flow channel 54 is provided inside the first fluid pipe 44, and a second flow channel 55 is provided inside the second fluid pipe 45. The first fluid pipe 44 and the second fluid pipe 45 are axially provided and aligned with a center line A1 as a center. The first fluid pipe 44 and the second fluid pipe 45 are the same in inner diameter and outer diameter as each other. In a planar view of the pump apparatus 10, the center line A1 is orthogonal to a center line B1 of the armature shaft. The first fluid pipe 44 is connected to the front window nozzle 60 via a pipe or hose. The second fluid pipe 45 is connected to the rear window nozzle 61 via a tube or hose. In addition, the housing 36 is provided with two ribs 46 which are placed at a predetermined interval, and extend in a direction along the center line A1. In a plane perpendicular to the center line A1, each of the ribs 46 is arranged in the form of "C" shape or inverted "C" shape.

In addition, two ribs 47 are formed on an inner surface of the cover 15. The ribs 47 are provided in the vicinity of the center line A1, and one rib 46 and one rib 47 are disposed at the same position in the same direction along the center line A1. One continuous attachment groove 48 is formed between two ribs 46 and 47. The attachment groove 48 is annularly formed so as to surround the center line A1. The attachment groove 48 has a predetermined width in the direction along the center line A1, and a space between an end portion 56 of the first fluid pipe 44 and an end portion 57 of the second fluid pipe 45 is equal to the width of the attachment groove 48. Furthermore, the ribs 46 and 47, the attachment groove 48, the first fluid pipe 44, and the second fluid pipe 45 are symmetrical in shape and structure with respect to a plane perpendicular to the center line A1.

Figure 7:
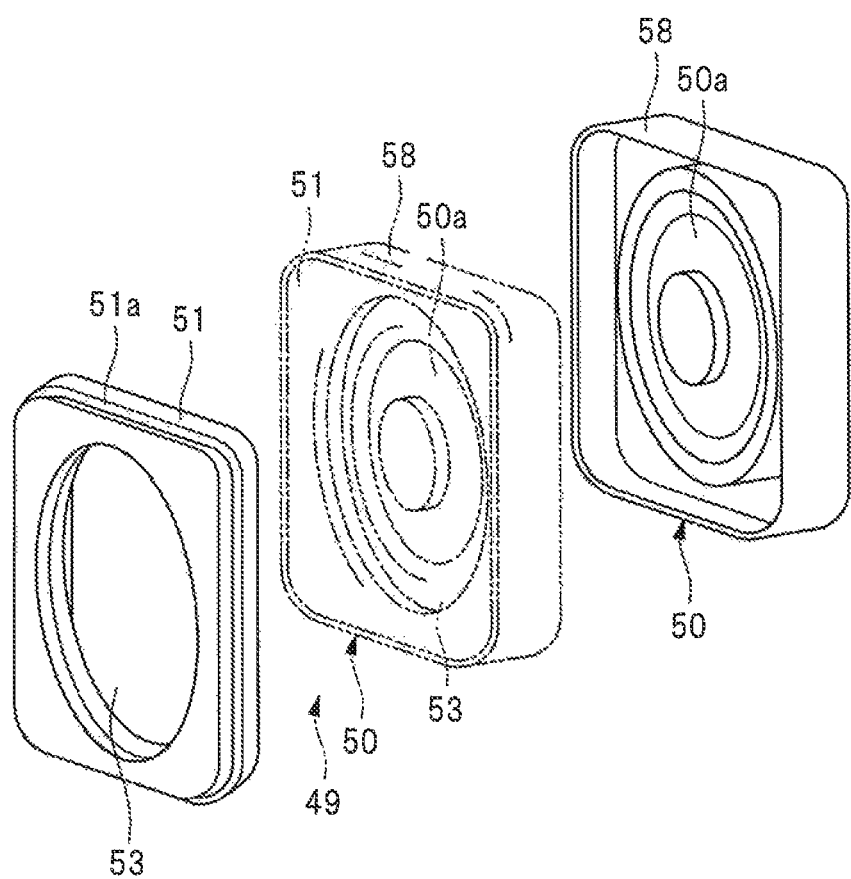
FIG. 7 is a perspective view of a valve body which is applied to the valve apparatus of the present invention.

In addition, a partition wall 49 is attached to the attachment groove 48. The partition wall 49 has: a valve body 50 formed of rubber-like elastic material; and a frame 51 which reinforce the valve body 50. The frame 51 has an annular shape as shown in FIG. 7, and the frame 51 includes a hole portion 53. The center line A1 is defined as a center of the hole portion 53, and the hole portion 53 has a circular shape in a plane perpendicular to the center line A1. The frame 51 is integrally formed of resin, and the frame 51 is higher in stiffness than the valve body 50.

The valve body 50 has: a film-like membrane portion 50a; and a hook-shaped engaging portion 58 provided so as to continuously extend from an outer circumference of the membrane portion 50a. The engaging portion 58 is provided over the entire circumference of the membrane portion 50a, and the engaging portion 58 has: a portion 58a extending in a radial direction with the center line A1 taken as a center; a cylindrical portion 58b extending from the portion 58a to a direction along the center line A1; and an annular rib 58c projecting from an end portion of the cylindrical portion 58b toward the inside. End faces of the rib 58c and the frame 51 and an end face of the portion 58a are perpendicular to the center line A1, and each has a shape bilaterally-symmetrical with respect to a plane perpendicular to the center line A1, that is, the same shape. A support groove 52 is formed among this portion 58a, the cylindrical portion 58b, and the rib 58c, and the partition wall 49 is assembled by fitting an outer circumference of the frame 51 into the support groove 52.

With the partition wall 49 attached to the attachment groove 48, the membrane portion 50a is disposed in the direction along the center line A1 at a position where the distance to the end portion 56 of the first fluid pipe 44 and the distance to the end portion 57 of the second fluid pipe 45 are equal to each other. The direction along the center line A1 is a direction in which the first fluid pipe 44 and the second fluid pipe 45 are disposed. Of both end faces of the membrane portion 50a, portions in contact with the end portions 56 and 57 are bilaterally-symmetrical flat surfaces.

Furthermore, a stepped portion 51a is provided over the entire outer circumference of the frame 51. With the outer circumference of the frame 51 fitted into the support groove 52, the cylindrical portion 58b surrounds the outside of the frame 51. That is, the cylindrical portion 58b and the rib 58c are positioned so as to be interposed between the frame 51 and the inner circumferential surface of the attachment groove 48. In addition, the rib 58c and the portion 58a are in close contact with the ribs 46 and 47.

With the cover 15 assembled to the casing 11, when the partition wall 49 is attached to the attachment groove 48, the partition wall 49 cannot be removed from the attachment groove 48. In a plane perpendicular to the center line A1, the hole portion 53 of the frame 51 has a circular inner circumferential shape. The first valve chamber 37 and the second valve chamber 38 formed in the housing 36 are partitioned by the partition wall 49 in a fluid-tight manner. Note that the valve body 50 and the frame 51 are not bonded or joined together and, when the cover 15 is removed from the casing 11 to remove the partition wall 49 from the casing 11, the valve body 50 and the frame 51 can be disassembled.

Furthermore, the vehicle 59 is provided with: a first washer switch for discharging cleaning fluid toward the front window 59a; and a second washer switch for discharging cleaning fluid toward the rear window 59b. Furthermore, the vehicle 59 is provided with: a front wiper for wiping the front window 59a; and a rear wiper for wiping the rear window 59b. Furthermore, the vehicle 59 is provided with: a first wiper switch and a front wiper motor for operating the front wiper; and a second wiper switch and a rear wiper motor for operating the rear wiper.

Next, the operation of the pump apparatus 10 will be described. When the first washer switch is operated and turned on, electric power is supplied to the terminals 25 to rotate the armature shaft 19 of the electric motor 17 in a predetermined direction. Here, when the impeller 35 is rotated together with the armature shaft 19, the pressure of the accommodation chamber 34 is decreased, thereby suctioning cleaning fluid in the washer tank 62 into the accommodation chamber 34 via the suction passage 30 and the passage 33.

Figure 4A:
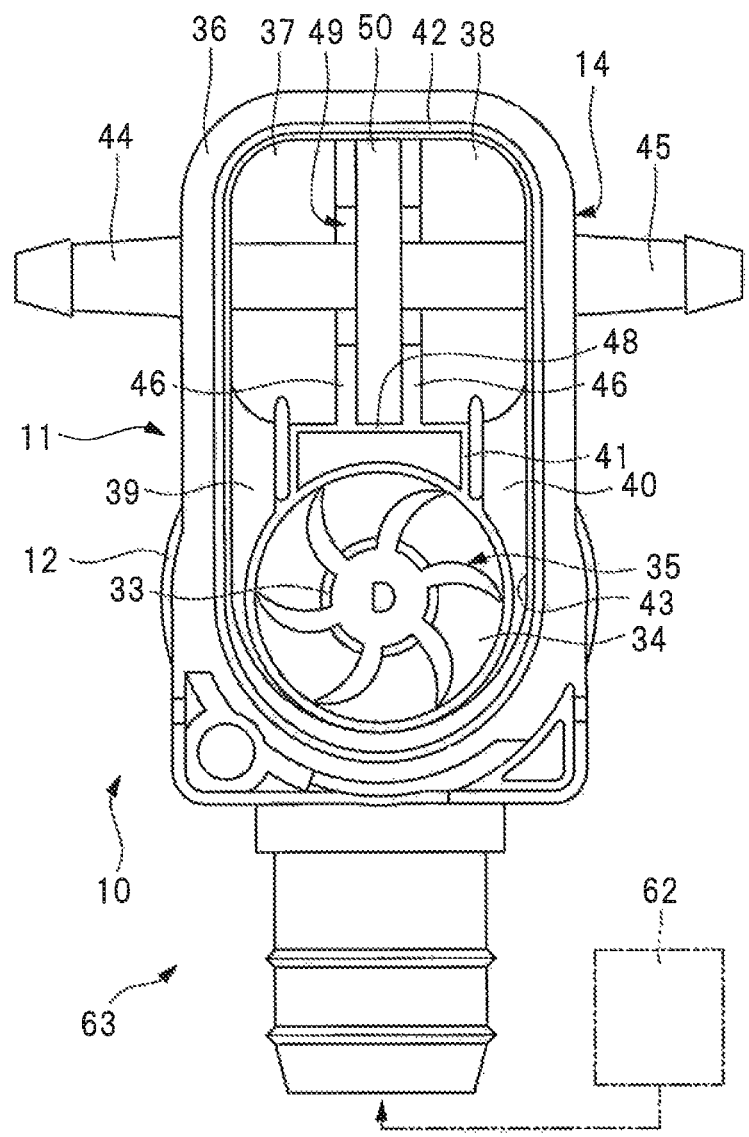
FIG. 4A is a schematic view showing the washer apparatus of the present invention.
Figure 4B:
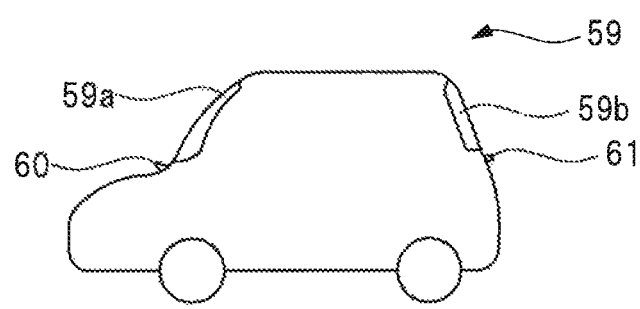
FIG. 4B is a schematic view of a vehicle including the washer apparatus.
Figure 5:
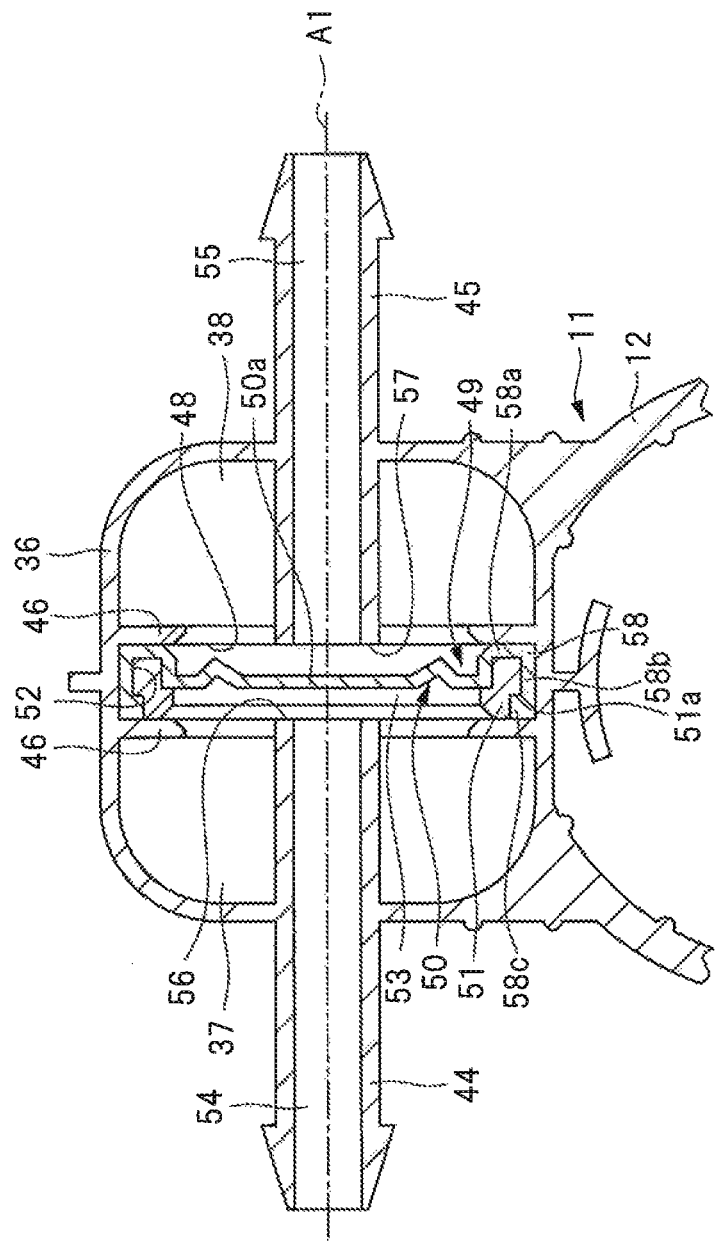
FIG. 5 is a sectional side view showing a valve apparatus of the present invention.
Figure 6:
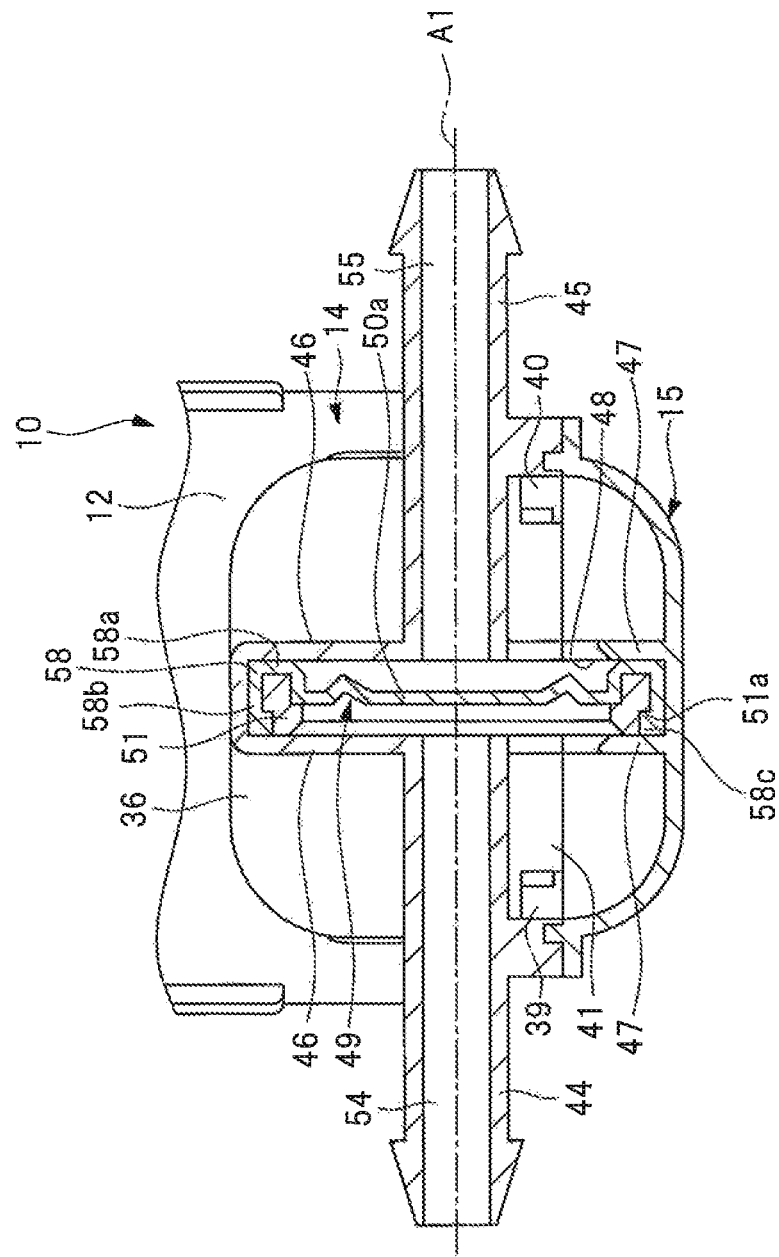
FIG. 6 is a sectional plan view showing the valve apparatus of the present invention.

In addition, when the first washer switch is operated, the impeller 35 is rotated in a clockwise direction in FIG. 4A, cleaning fluid suctioned to the accommodation chamber 34 is pumped to the first valve chamber 37 via the first passage 39, and the pressure of the second valve chamber 38 is decreased. As a result, a pressure difference between the first valve chamber 37 and the second valve chamber 38 causes the valve body 50 of the partition wall 49 to be elastically deformed, the valve body 50 is brought into close contact with the end portion 57 of the second fluid pipe 45, the second valve chamber 38 and the second flow channel 55 are interrupted, and the first valve chamber 37 and the first flow channel 54 are connected to each other. That is, the second flow channel 55 is closed by the partition wall 49. Therefore, cleaning fluid pumped from the accommodation chamber 34 to the first valve chamber 37 is discharged from the front window nozzle 60 via the first flow channel 54.

Furthermore, when the first washer switch is operated and electric power supply to the terminals 25 is interrupted after a certain period of time, the armature shaft 19 of the electric motor 17 stops. Therefore, since the impeller 35 stops, cleaning fluid in the washer tank 62 is not suctioned to the accommodation chamber 34. In addition, the internal pressure of the first valve chamber 37 and the internal pressure of the second valve chamber 38 become equal to each other, and the valve body 50 returns to its original shape by elastic resilience. As a result, the valve body 50 is separated from the end portions 56 and 57. Therefore, the first valve chamber 37 and the first flow channel 54 become connected to each other, and the second valve chamber 38 and the second flow channel 55 become connected to each other. Then, when the first wiper switch is operated, the front wiper motor is driven to cause the front wiper to wipe the front window 59a.

On the other hand, when the second washer switch is operated and turned on, electric power is supplied to the terminals 25 to rotate the armature shaft 19 of the electric motor 17 in a predetermined direction. The rotation direction of the armature shaft 19 is opposite to the rotation direction by the first washer switch. When the armature shaft 19 is rotated, cleaning fluid is suctioned to the accommodation chamber 34 in a manner similar to the above-described manner.

In addition, when the second washer switch is operated and turned on, the impeller 35 is rotated in a counterclockwise direction in FIG. 4A, cleaning fluid suctioned to the accommodation chamber 34 is pumped to the second valve chamber 38 via the second passage 40, and the pressure of the first valve chamber 37 is decreased. As a result, the pressure of cleaning fluid in the second valve chamber 38 causes the valve body 50 to be elastically deformed, the valve body 50 comes in close contact with the end portion 56 of the first fluid pipe 44, the first valve chamber 37 is interrupted from the first flow channel 54 are, and the second valve chamber 38 and the second flow channel 55 are connected to each other. That is, the first flow channel 54 is closed by the partition wall 49. Therefore, cleaning fluid pumped from the accommodation chamber 34 to the second valve chamber 38 is discharged from the rear window nozzle 61 via the second flow channel 55.

Furthermore, when the second washer switch is operated and turned off, the armature shaft 19 of the electric motor 17 stops after a certain period of time. Then, the valve body 50 returns to its original shape in a manner similar to those described above, and the valve body 50 is separated from the end portions 56 and 57. Therefore, the first valve chamber 37 and the first flow channel 54 become connected to each other, and the second valve chamber 38 and the second flow channel 55 become connected to each other. Furthermore, when the second wiper switch is operated, the rear wiper motor is driven to cause the rear wiper to wipe the rear window 59b.

In this embodiment, the valve body 50 of the partition wall 49 is elastically deformed in the direction along the center line A1 when the pressure of cleaning fluid increases, and returns to its original shape when the pressure of cleaning fluid decreases. When the valve body 50 is elastically deformed, a force is generated so as to bring the engaging portion 58 provided to the entire outer circumference of the valve body 50 closer to the center line A1. In this embodiment, the frame 51 is provided inside the engaging portion 58 in a radial direction with the center line A1 taken as a center. Therefore, the frame 51 prevents the engaging portion 58 from moving so as to approach the center line A1.

More specifically, the frame 51 has an outer circumferential edge disposed in the support groove 52 of the valve body 50, and the rib 58c is in contact with the stepped portion 51a of the frame 51. Therefore, even if a force is generated so as to bring the engaging portion 58 closer to the center line A1, the force is received by the frame 51, with the rib 58c being engaged with the stepped portion 51a. Since the frame 51 is formed of resin and higher in stiffness than the valve body 50 formed of rubber-like elastic material, the force applied to the valve body 50 does not deform the frame 51.

Therefore, the engaging portion 58 of the valve body 50 can be prevented from exiting from the attachment groove 48, and from being tilted in the attachment groove 48. As a result, the functions of the valve apparatus 14 can be prevented from being reduced. Furthermore, the cover 15 and the casing 11 do not have to have a complex shape for preventing the engaging portion 58 from exiting from the attachment groove 48. Therefore, the pump apparatus 10 can be improved in assembling performance and moldability. The functions of the valve apparatus 14 include: a function of bringing the valve body 50 into close contact with either the end portion 56 or the end portion 57; and a function of separating the valve body 50 from both the end portions 56 and 57.

In addition, in a process of assembling the pump apparatus 10, after the partition wall 49 is attached inside the housing 36, the cover 15 is fixed to an opening of the casing 11. In a process of fixing the cover 15 to the casing 11, the outer circumferential surface of the valve body 50 is pressed onto the housing 36 and the cover 15 with the stiffness of the frame 51. That is, the partition wall 49 becomes in a state of being press-fitted into the attachment groove 48. Therefore, the partition wall 49 can be easily positioned with respect to the casing 11 and the cover 15 in a radial direction with the center line A1 taken as a center, and assembling operation performance of the pump apparatus 10 is improved.

Furthermore, end faces of the rib 58c and the frame 51 facing the first valve chamber 37 or the second valve chamber 38 and end faces of the portion 58a facing the first valve chamber 37 or the second valve chamber 38 are perpendicular to the center line A1, and in addition bilaterally symmetrical with respect to a plane perpendicular to the center line A1. Still further, the ribs 46 and 47 are bilaterally symmetrical with respect to a plane perpendicular to the center line A1. Therefore, when the partition wall 49 is attached to the attachment groove 48, the partition wall 49 can be attached so as to be oriented so that the frame 51 is brought closer to the first fluid pipe 44 or the second fluid pipe 45 in a direction along the center line A1. That is, when the partition wall 49 is attached to the attachment groove 48, either the front or back of the partition wall 49 may be attached. Therefore, in the process of assembling the pump apparatus 10, it is possible to avoid a complication in an operation of attaching the partition wall 49.

Furthermore, when the impeller 35 is in a stopped state, the membrane portion 50a of the partition wall 49 is positioned between the end portion 56 of the first fluid pipe 44 and the end portion 57 of the second fluid pipe 45 in a direction along the center line A1. In the membrane portion 50a, a portion in contact with the end portions 56 and 57 forms a bilaterally-symmetrical flat surface. Therefore, rectification of cleaning fluid by the partition wall 49 can be improved. That is, a flow path of cleaning fluid flowing from the first valve chamber 37 into the first flow channel 54 and a flow path of cleaning fluid flowing from the second valve chamber 38 into the second flow channel 55 are symmetrical to each other.

Therefore, the injection pressure of cleaning fluid to be discharged through the first flow channel 54 can be set to be equal to that of cleaning fluid to be discharged through the second flow channel 55. That is, the injection pressure of cleaning fluid is prevented from being varied, and the pump apparatus 10 can be improved in quality.

Cleaning fluid described in the above embodiment corresponds to fluid of the present invention, the ribs 46 and 47 correspond to a support portion of the present invention, and the housing 36 corresponds to a housing of the present invention. Furthermore, either the first flow channel 54 or the second flow channel 55 may correspond to one or the other channel of the invention. An end face of the specific part 58a, an end face of the rib 58c, and an end face of the frame 51 correspond to a contact surface of the present invention.

The present invention is not limited to the above-described embodiment, and it goes without saying that the present invention can be variously changed without departing from the scope of the invention. For example, the valve body 50 may be formed of rubber-like elastic material, and the frame 51 may be formed of metal and higher in stiffness than rubber-like elastic body.

The present invention can be applied to a washer apparatus which discharges cleaning fluid stored in a washer tank of a vehicle toward a front window or a rear window.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A valve apparatus for supplying pumped fluid by switching between a first flow channel and a second flow channel, the valve apparatus comprising:
   a housing provided with a first valve chamber connected to the first flow channel and a second valve chamber connected to the second flow channel;
   a partition wall disposed between the first flow channel and the second flow channel in the housing to separate the first valve chamber from the second valve chamber; and
   a support portion provided inside the housing to support the partition wall,
   wherein the partition wall has:
   a film-like valve body which is elastically deformed by pressure of the first valve chamber and the second valve chamber so as to open one of the first flow channel and the second flow channel and close the other of the first flow channel and the second flow channel; and
   a frame attached along an outer circumference of the valve body and supported by the support portion,
   wherein the frame is higher in stiffness than the valve body, and
   wherein the first flow channel and the second flow channel are coaxially aligned with each other, and the valve body comprises:
   an engaging portion formed along the outer circumference of the valve body and projecting inward in a radial direction of the first flow channel and the second flow channel; and
   a support groove disposed in the engaging portion in the radial direction, an outer circumference of the frame being fitted into the support groove.

2. The valve apparatus according to claim 1, further comprising:
   a first fluid pipe including the first flow channel; and
   a second fluid pipe including the second flow channel and disposed concentrically with the first fluid pipe, and
   a distance from the valve body to an end portion of the first fluid pipe and a distance from the valve body to an end portion of the second fluid pipe are equal to each other in a direction in which the first fluid pipe and the second fluid pipe are disposed.

3. The valve apparatus according to claim 2, wherein an outer circumferential portion of the partition wall is provided with a contact surface extending in a direction perpendicular to each axis direction of the first fluid pipe and the second fluid pipe, and the contact surface is in contact with the support portion.

4. A washer apparatus, comprising:
   a washer tank in which fluid is stored;
   a pump apparatus which is rotated by motive power of an electric motor to suction and pump fluid in the washer tank;
   a first flow channel which supplies fluid pumped by the pump apparatus to a front window nozzle of a vehicle;
   a second flow channel which supplies fluid pumped by the pump apparatus to a rear window nozzle of the vehicle; and
   a valve apparatus which supplies fluid pumped by the pump apparatus by switching between the first flow channel and the second flow channel, the valve apparatus comprising:
   a housing provided with a first valve chamber connected to the first flow channel and a second valve chamber connected to the second flow channel;
   a partition wall disposed between the first flow channel and the second flow channel in the housing to partition the first valve chamber and the second valve chamber, and
   a support portion provided inside the housing to support the partition wall,
   wherein the partition wall has:
   a film-like valve body which is elastically deformed by pressure of the first valve chamber and the second valve chamber so as to open one of the first flow channel and the second flow channel and close the other of the first flow channel and the second flow channel; and
   a frame attached along an outer circumference of the valve body and supported by the support portion,
   wherein the frame is higher in stiffness than the valve body, and
   wherein the first flow channel and the second flow channel are coaxially aligned with each other, and the valve body comprises:
   an engaging portion formed along the outer circumference of the valve body and projecting inward in a radial direction of the first flow channel and the second flow channel; and
   a support groove disposed in the engaging portion in the radial direction, an outer circumference of the frame being fitted into the support groove.

* * * * *